United States Patent
Lin et al.

(10) Patent No.: US 11,936,927 B2
(45) Date of Patent: Mar. 19, 2024

(54) TRANSMISSION CONTROL SYSTEM OF MULTI-MEDIA SIGNAL, TRANSMITTER CONTROL CIRCUIT AND RECEIVER CONTROL CIRCUIT

(71) Applicant: Realtek Semiconductor Corporation, Hsinchu (TW)

(72) Inventors: Yun-Hung Lin, Hsinchu (TW); Po-Hsien Wu, Hsinchu (TW); Li-Yu Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 17/447,195

(22) Filed: Sep. 8, 2021

(65) Prior Publication Data

US 2022/0094994 A1 Mar. 24, 2022

Related U.S. Application Data

(60) Provisional application No. 63/082,007, filed on Sep. 23, 2020.

(30) Foreign Application Priority Data

Jun. 18, 2021 (TW) .................................. 110122491

(51) Int. Cl.
*H04N 21/2368* (2011.01)
*G09G 3/36* (2006.01)
(Continued)

(52) U.S. Cl.
CPC ....... *H04N 21/2368* (2013.01); *G09G 3/3611* (2013.01); *G09G 5/006* (2013.01);
(Continued)

(58) Field of Classification Search
CPC .......... H04N 21/2368; H04N 21/2365; H04N 21/4347; G09G 3/3611; G09G 5/006; G09G 2310/0297
See application file for complete search history.

(56) References Cited

U.S. PATENT DOCUMENTS 11,205,400 B1 * 12/2021 Jang ..................... G09G 3/2092
2002/0136241 A1 * 9/2002 Pasqualino ............. H03L 7/085
375/E7.274

(Continued)

FOREIGN PATENT DOCUMENTS

TW 200832350 A 8/2008
TW 201440527 A 10/2014

OTHER PUBLICATIONS

English Translation of CN 103782604 (Year: 2014).*

*Primary Examiner* — Patrick N Edouard
*Assistant Examiner* — Eboni N Giles
(74) *Attorney, Agent, or Firm* — CKC & Partners Co., LLC

(57) ABSTRACT

A multimedia signal transmission control system is provided, which includes a transmitter control circuit and a receiver control circuit coupled with each other. The transmitter control circuit packs a control signal and at least one of multimedia signals into first hybrid data packets in an active video period of a video frame, and packs the control signal and another at least one of the multimedia signals into second hybrid data packets in a vertical front porch and a vertical back porch of the video frame. The receiver control circuit receives the first hybrid data packets in the active video period, and receives the second hybrid data packets in the vertical front porch and the vertical back porch. The receiver control circuit unpacks the first hybrid data packets
(Continued)

and the second hybrid data packets to provide the control signal and the multimedia signals to a display module.

14 Claims, 6 Drawing Sheets

(51) Int. Cl.
  *G09G 5/00* (2006.01)
  *H04N 21/2365* (2011.01)
  *H04N 21/434* (2011.01)
(52) U.S. Cl.
  CPC . *G09G 2310/0297* (2013.01); *H04N 21/2365* (2013.01); *H04N 21/4347* (2013.01)

(56) References Cited

U.S. PATENT DOCUMENTS

| | | | | |
|---|---|---|---|---|
| 2008/0317440 | A1* | 12/2008 | Shoji | H04N 5/46 |
| | | | | 386/200 |
| 2010/0033627 | A1* | 2/2010 | Hayashi | H04N 5/775 |
| | | | | 348/E5.009 |
| 2014/0205024 | A1* | 7/2014 | Toba | H04N 21/816 |
| | | | | 375/240.28 |
| 2014/0354827 | A1* | 12/2014 | Nakashima | G09G 3/3406 |
| | | | | 348/177 |

\* cited by examiner

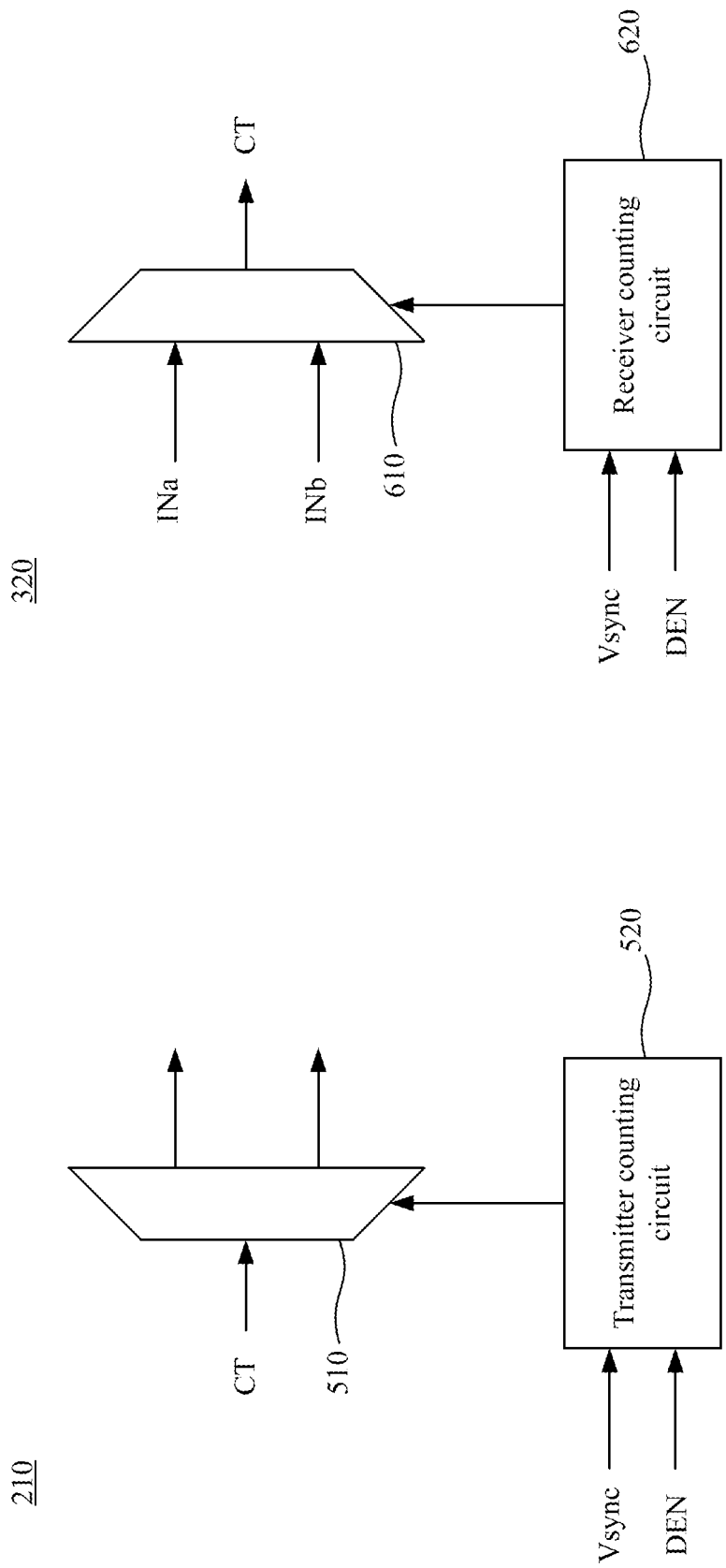

TRANSMISSION CONTROL SYSTEM OF MULTI-MEDIA SIGNAL, TRANSMITTER CONTROL CIRCUIT AND RECEIVER CONTROL CIRCUIT

RELATED APPLICATION

This application claims priority to U.S. Provisional Application Ser. No. 63/082,007 filed Sep. 23, 2020, and Taiwan Application Serial Number 110122491, filed Jun. 18, 2021, the disclosures of which are incorporated herein by reference in their entireties.

BACKGROUND

Technical Field

The present disclosure relates to a multimedia broadcasting system and a transceiver control circuit and a receiver control circuit thereof. More particularly, the present disclosure relates to a multimedia broadcasting system and a transceiver control circuit and a receiver control circuit thereof configured to simplify signal transmission interfaces.

Description of Related Art

A display device includes a control module and a display module. The control module is configured to decode video data and adjust the resolution of the video data. The control module is further configured to transmit various control signals to the display module to control the display module to provide corresponding images. In general, the components of the control module are disposed on a printed circuit board, and most of the components of the display module are disposed on a glass substrate. In order to encapsulate the control module and the display module into a single device, a thick shell is required to accommodate these two different substrates. Therefore, the current design trend is to separate the control module with the display module so that the display module, which occupies most of the display device's volume, can become much thinner. In conventional arts, the control module performs data transmission with the display module through various transmission interfaces, such as the serial peripheral interface (SPI) bus, the inter-integrated circuit (I2C) bus, etc. These complex transmission interfaces are designed for short-distance transmission and require a different transmission lines, and thus is un-compatible to the design of separating the control module and the display module.

SUMMARY

The disclosure provides a multimedia signal transmission control system, which includes a transmitter control circuit and a receiver control circuit. The transmitter control circuit is configured to pack, in an active video period of a video frame, a control signal and at least one of a plurality of multimedia signals into a plurality of first hybrid data packets. The transmitter control circuit is also configured to pack, in a vertical front porch and a vertical back porch of the video frame, the control signal and another at least one of the plurality of multimedia signals into a plurality of second hybrid data packets. The receiver control circuit is coupled to the transmitter control circuit, and configured to receive the plurality of first hybrid data packets in the active video period. The receiver control circuit is also configured to receive the plurality of second hybrid data packets in the vertical front porch and the vertical back porch. The receiver control circuit is configured to unpack the plurality of first hybrid data packets and the plurality of second hybrid data packets to provide the control signal and the plurality of multimedia signals to a display module.

The disclosure provides a transmitter control circuit suitable for a multimedia signal transmission control system. The transmitter control circuit is configured to pack, in an active video period of a video frame, a control signal and at least one of a plurality of multimedia signals into a plurality of first hybrid data packets. The transmitter control circuit is also configured to pack, in a vertical front porch and a vertical back porch of the video frame, the control signal and another at least one of the plurality of multimedia signals into a plurality of second hybrid data packets. When the transmitter control circuit is coupled to a receiver control circuit, the receiver control circuit receives the plurality of first hybrid data packets in the active video period, and receives the plurality of second hybrid data packets in the vertical front porch and the vertical back porch. The receiver control circuit unpacks the plurality of first hybrid data packets and the plurality of second hybrid data packets, so that the transmitter control circuit provides the control signal and the plurality of multimedia signals to a display module through the receiver control circuit.

The disclosure provides a receiver control circuit suitable for a multimedia signal transmission control system. The receiver control circuit is configured to be coupled to a transmitter control circuit. The transmitter control circuit is configured to pack, in an active video period of a video frame, a control signal and at least one of a plurality of multimedia signals into a plurality of first hybrid data packets. The transmitter control circuit is also configured to pack, in a vertical front porch and a vertical back porch of the video frame, the control signal and another at least one of the plurality of multimedia signals into a plurality of second hybrid data packets. The receiver control circuit is configured to receive the plurality of first hybrid data packets in the active video period, and configured to receive the plurality of second hybrid data packets in the vertical front porch and the vertical back porch. The receiver control circuit is configured unpack the plurality of first hybrid data packets and the plurality of second hybrid data packets to provide the control signal and the plurality of multimedia signals to a display module.

It is to be understood that both the foregoing general description and the following detailed description are by examples, and are intended to provide further explanation of the disclosure as claimed.

BRIEF DESCRIPTION OF THE DRAWINGS

FIG. 5 is a simplified functional block diagram of the signal distribution circuit according to one embodiment of the present disclosure.

FIG. 6 is a simplified functional block diagram of the signal combination circuit according to one embodiment of the present disclosure.

DETAILED DESCRIPTION

Figure 1:
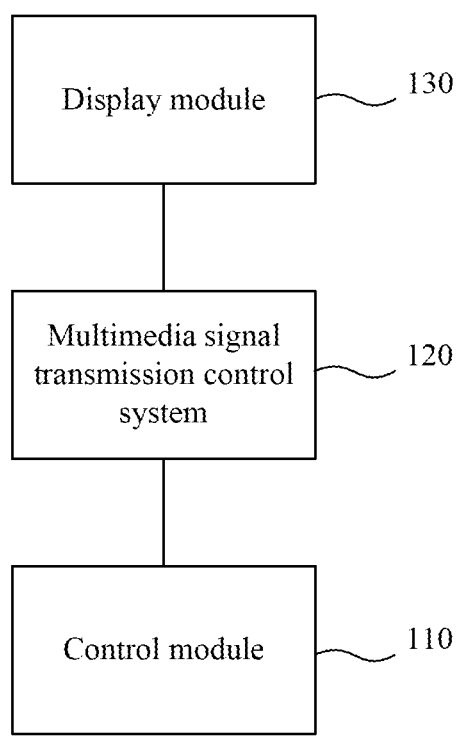
FIG. 1 is a simplified functional block diagram of a multimedia broadcasting system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of a multimedia broadcasting system 100 according to one embodiment of the present disclosure. The multimedia broadcasting system 100 comprises a control module 110, a multimedia signal transmission control system 120 and a display module 130. The multimedia signal transmission control system 120 is coupled between the control module 110 and the display module 130. The control module 110 is configured to receive multimedia signals through an audio and/or video streaming or from a graphic processing unit, and configured to transform the multimedia signals to data formats suitable for the playback of the display module 130. The control module 110 provides the transformed multimedia signals to the display module 130 through the multimedia signal transmission control system 120. The control module 110 is further configured to transmit additional control signals to the display module 130 through the multimedia signal transmission control system 120. In some embodiments, for example, the display module 130 comprises a pixel array 710 and a backlight module 730 of FIG. 7, and the control module 110 transmits a backlight control signal and a pulse width modulation signal to the display module 130, through the multimedia signal transmission control system 120, so as to control the brightness of the backlight of the display module 130.

In this embodiment, the multimedia signal transmission control system 120 utilizes single transmission interface (e.g. the high definition multimedia interface (HDMI)) to transmit the multimedia signals from the control module 110 to the display module 130, which is conductive to reduce the number of transmission lines, but this disclosure is not limited thereto. In this embodiment, part of the multimedia signal transmission control system 120 is integrated into the control module 110 to form one device, and another part of the multimedia signal transmission control system 120 is integrated into the display module 130 to form another device, but this disclosure is not limited thereto. In some embodiments, the multimedia signal transmission control system 120 and the transmission lines are implemented as a single device connected to the control module 110 and the display module 130 by plug-in connectors.

In some embodiments, the control module 110 may be implemented by the scaler IC, the video decoder, the analog-to-digital converter, the microprocessor, the memory circuit or any combination thereof.

Figure 2:
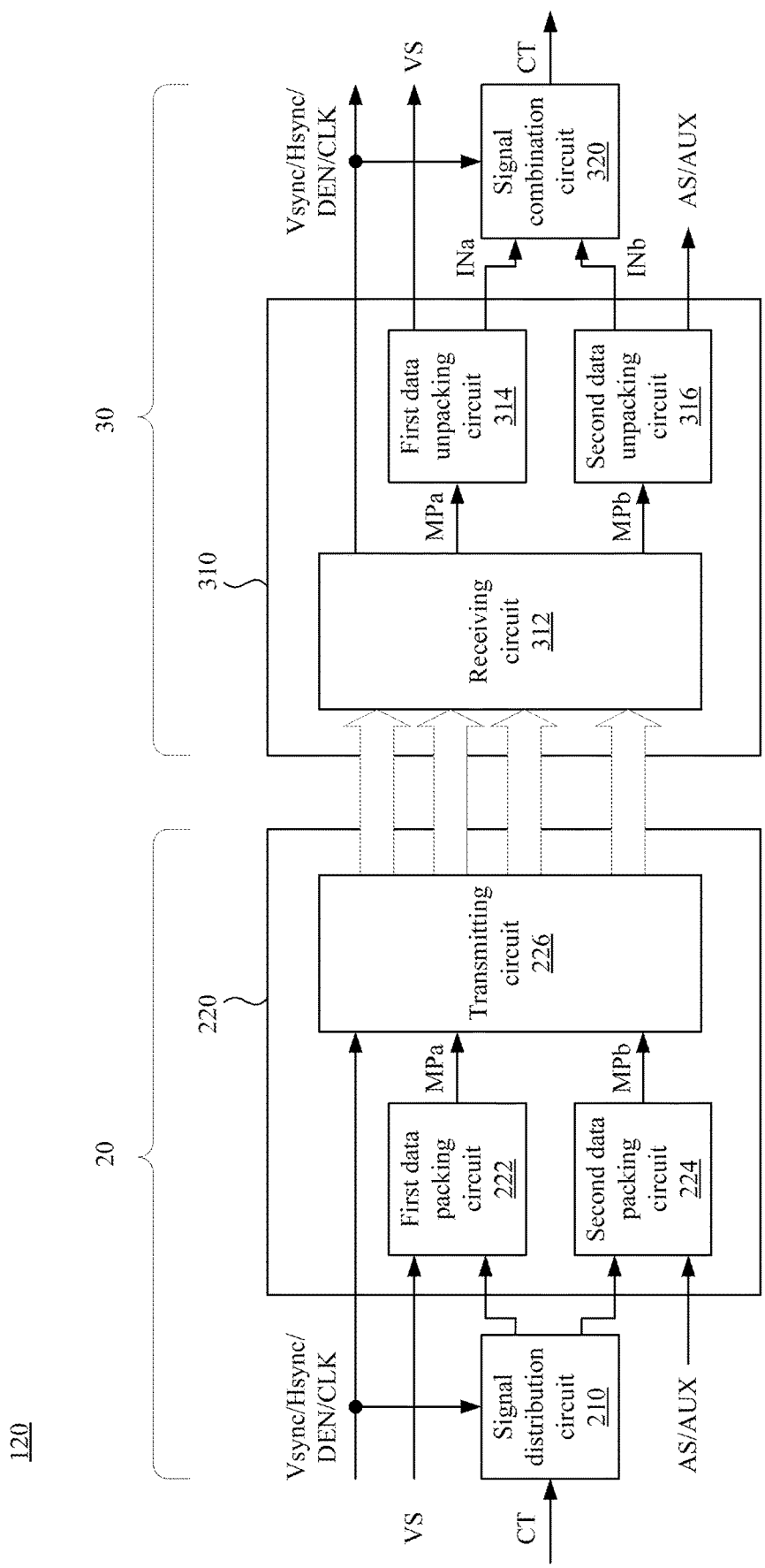
FIG. 2 is a simplified functional block diagram of the multimedia signal transmission control system according to one embodiment of the present disclosure.

FIG. 2 is a simplified functional block diagram of the multimedia signal transmission control system 120 according to one embodiment of the present disclosure. The multimedia signal transmission control system 120 comprises a transmitter control circuit 20 and a receiver control circuit 30 coupled to each other. The transmitter control circuit 20 is configured to be coupled to the control module 110, or to be integrated into the control module 110 in some embodiments. The receiver control circuit 30 is configured to be coupled to the display module 130, or to be integrated into the display module 130 in some embodiments. In some embodiments, the transmitter control circuit 20 and the receiver control circuit 30 are coupled to each other by the transmission lines.

The transmitter control circuit 20 receives a vertical synchronization signal Vsync, a horizontal synchronization signal Hsync, a data enable signal DEN, and a pixel clock signal CLK. In addition, the transmitter control circuit 20 comprises a signal distribution circuit 210 and a transmitter interface circuit 220. The signal distribution circuit 210 is configured to receive a control signal CT from the control module 110. In some embodiments, the control signal CT comprises, but not limited to, the backlight control signal, the pulse width modulation signal, the panel calibration signal, etc., in which the panel calibration signal may be used to calibrate the non-uniform brightness of a panel. In other embodiments, the control signal CT is different from a video signal VS, an audio signal AS and an auxiliary data signal AUX. The transmitter interface circuit 220 is configured to receive multimedia signals from the control module 110. The multimedia signals comprise, but not limited to, the video signal VS, the audio signal AS and the auxiliary data signal AUX. In some embodiments, the auxiliary data signal AUX is configured to transmit the specification of the multimedia signals or information required for regenerating an audio clock. In other embodiments, the video signal VS is configured to specify grayscales of pixels in the pixel array 710 of FIG. 7.

Figure 3:
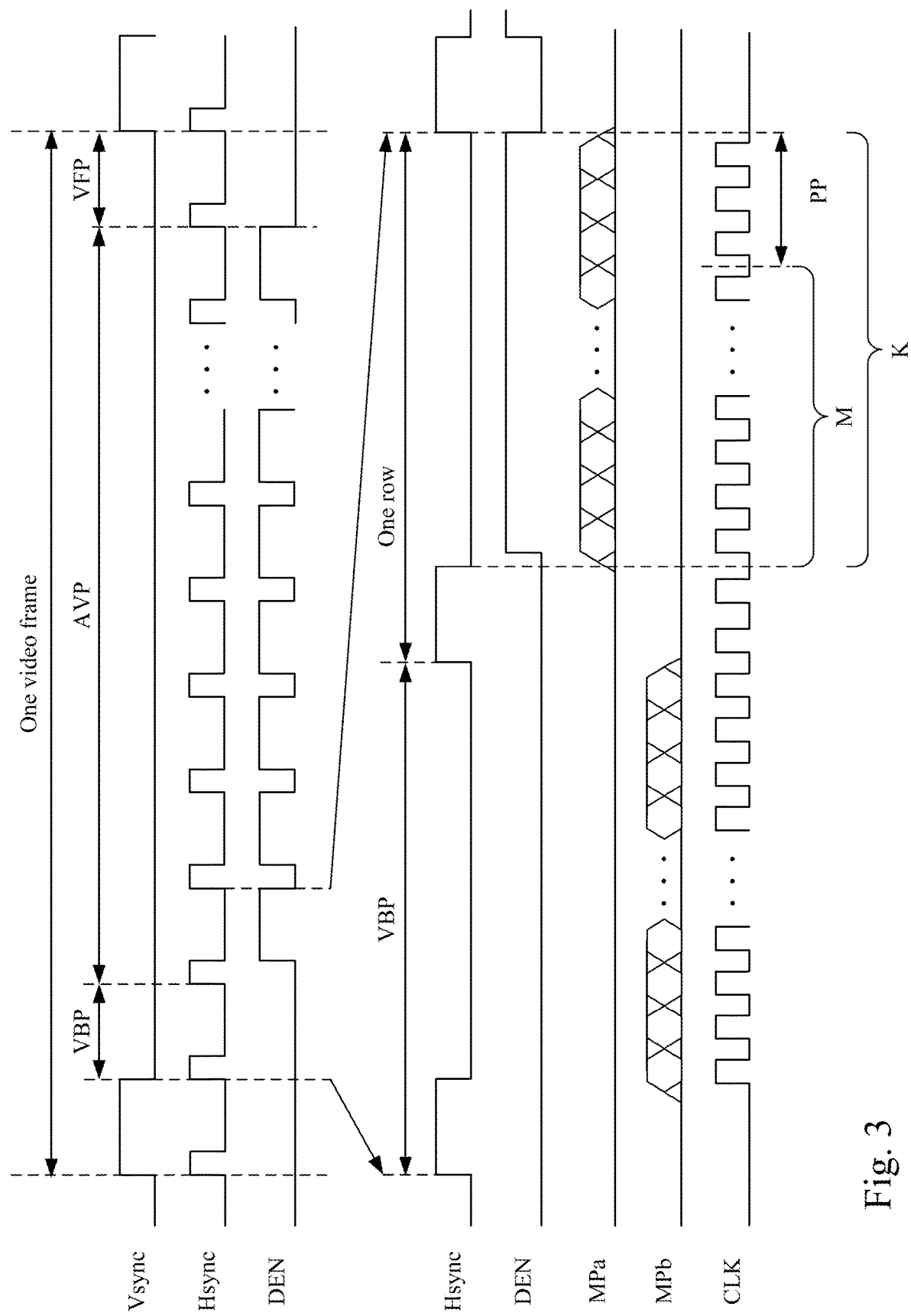
FIG. 3 is a simplified waveform schematic diagram of signals processed by the multimedia signal transmission control system.

FIG. 3 is a simplified waveform schematic diagram of signals processed by the multimedia signal transmission control system 120. The vertical synchronization signal Vsync is configured to control a time length of each video frame of the display module 130. For example, an interval between two adjacent pulses of the vertical synchronization signal Vsync is the time length of one video frame. The horizontal synchronization signal Hsync and the data enable signal DEN are configured to control the display module 130 to update a corresponding row of pixels. The pixel clock signal CLK is configured to further control the display module 130 to update a corresponding pixel in the row.

In one video frame, a period between a pulse of the vertical synchronization signal Vsync and the first pulse of the data enable signal DEN is referred to as a "vertical back porch VBP." In addition, a period between the last pulse of the data enable signal DEN in a video frame and a pulse of the vertical synchronization signal Vsync of the next video frame is referred to as a "vertical front porch VFP." In the vertical back porch VBP and the vertical front porch VFP, the multimedia signal transmission control system 120 transmits information carried by the audio signal AS or the auxiliary data signal AUX. A period between the vertical back porch VBP and the vertical front porch VFP is referred to as an "active video period AVP." The multimedia signal transmission control system 120 transmits information carried by the video signal VS in the active video period AVP. Notably, in order to obtain sufficient continuous bandwidth under a single communication protocol, the multimedia signal transmission control system 120 distributes information carried by the control signal CT to the vertical back porch VBP, the vertical front porch VFP and the active video period AVP.

Reference is made to FIG. 2 and FIG. 3. In the vertical back porch VBP and the vertical front porch VFP, the signal distribution circuit 210 provides the control signal CT by a first output terminal thereof to a first data packing circuit 222 of the transmitter interface circuit 220. The first data packing circuit 222 is coupled to the first output terminal of the signal distribution circuit 210, configured to receive the video signal VS, and configured to pack the video signal VS and the control signal CT into a plurality of first hybrid data packets MPa.

On the other hand, the signal distribution circuit 210 provides the control signal CT by a second output terminal thereof to a second data packing circuit 224 of the transmitter interface circuit 220 in the active video period AVP. The second data packing circuit 224 is coupled to the second output terminal of the signal distribution circuit 210, configured to receive the audio signal AS and the auxiliary data signal AUX, and configured to pack the audio signal AS or the auxiliary data signal AUX with the control signal CT into a plurality of second hybrid data packets MPb.

The first data packing circuit 222 and the second data packing circuit 224 provide the first hybrid data packets MPa and the second hybrid data packets MPb, respectively, to a transmitting circuit 226 of the transmitter interface circuit 220. The transmitting circuit 226 has an encoding function, and can be used to encode the first hybrid data packets MPa, the second hybrid data packets MPb, the vertical synchronization signal Vsync, the horizontal synchronization signal Hsync, the data enable signal DEN and the pixel clock signal CLK. The transmitting circuit 226 may transmit the encoded information to the receiver control circuit 30 by using suitable data transmission approaches. In some embodiments, in order to increase the transmission distance of the multimedia signal transmission control system 120, the transmitting circuit 226 uses the transition-minimized differential signaling (TMDS) technique to perform data communication with the receiver control circuit 30.

Figure 4:
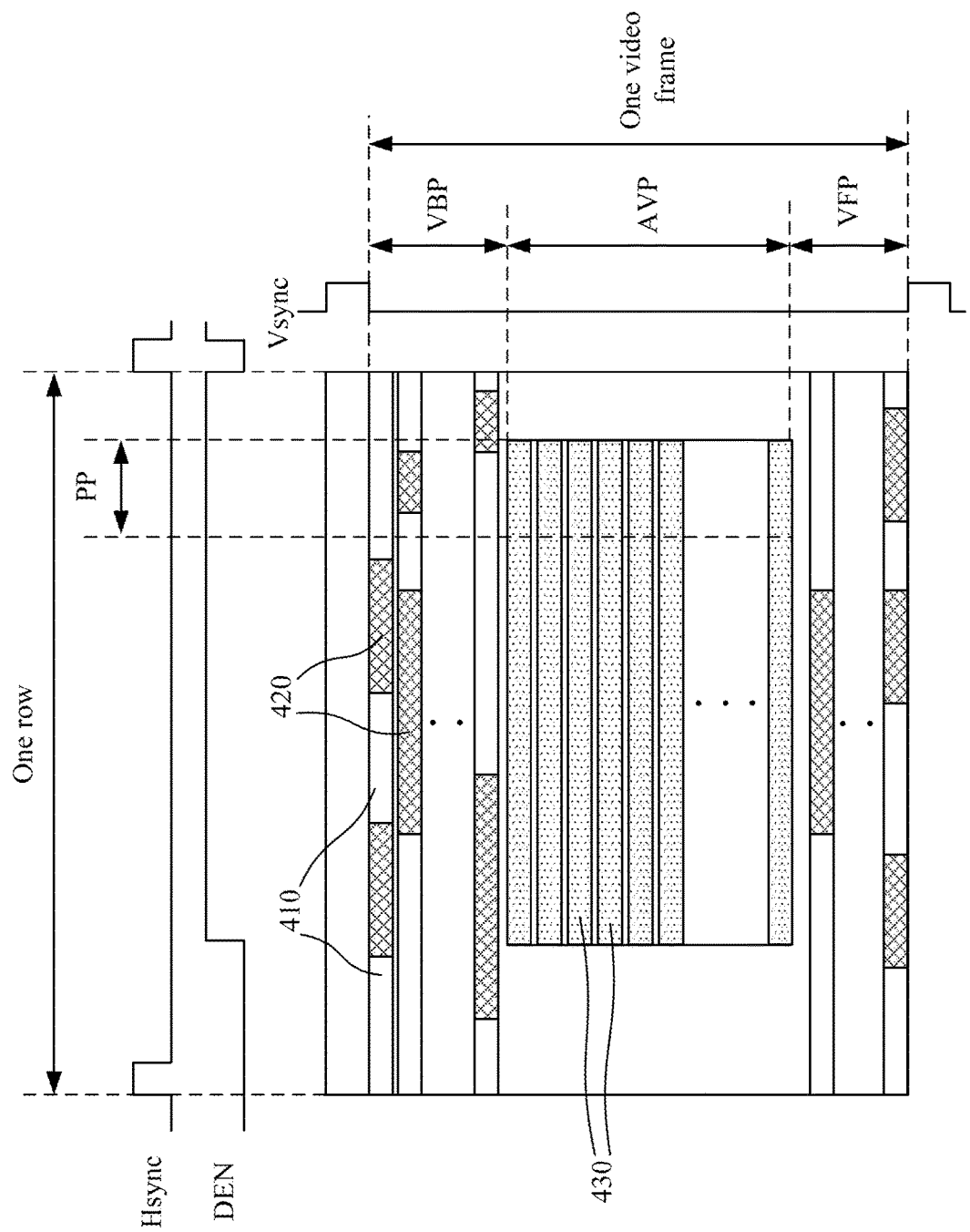
FIG. 4 is a timing diagram of signal transmission of the multimedia signal transmission control system.

FIG. 4 is a timing diagram of signal transmission of the multimedia signal transmission control system 120. As shown in FIG. 4, the vertical back porch VBP and the vertical front porch VFP comprise a plurality of control periods 410 (depicted as blank blocks) and a plurality of data island periods 420 (depicted as blocks with cross-hatching pattern). In the control period 410, the transmitting circuit 226 transmits the vertical synchronization signal Vsync, the horizontal synchronization signal Hsync and the preamble to the receiver control circuit 30. In the data island period 420, the transmitting circuit 226 transmits the second hybrid data packets MPb to the receiver control circuit 30, that is, the transmitting circuit 226 transmits hybrid information of the control signal CT, the audio signal AS and/or the auxiliary data signal AUX. The active video period AVP comprises a plurality of video data period 430 (depicted as blocks with dotted pattern). In the video data period 430, the transmitting circuit 226 transmits the first hybrid data packets MPa to the receiver control circuit 30, that is, the transmitting circuit 226 transmits hybrid information of the control signal CT and the video signal VS.

Accordingly, in the active video period AVP of the video frame, the transmitter control circuit 20 is configured to pack the control signal CT and at least one of the plurality of multimedia signals (e.g., the video signal VS) from the control module 110 into the first hybrid data packets MPa and transmit the first hybrid data packets MPa. In specific, as shown in FIG. 3, the transmitter control circuit 20 transmits the first hybrid data packets MPa when the data enable signal DEN provides pulses. In the vertical back porch VBP and the vertical front porch VFP of the video frame, the transmitter control circuit 20 is configured to pack the control signal CT and another at least one of the plurality of multimedia signals (e.g., the audio signal AS or the auxiliary data signal AUX) from the control module 110 into the second hybrid data packets MPb and transmit the second hybrid data packets MPb.

In some embodiments, the transmitter control circuit 20 may generate the first hybrid data packets MPa and the second hybrid data packets MPb according to a self-defining packet format. Such self-defining packet format means to give user-defined headers to the first hybrid data packets MPa and the second hybrid data packets MPb. The user-defined header is different form the header of the packet which has the predetermined format defined by the specification of the multimedia signal transmission control system 120 (e.g., the video packet, the audio packet or the auxiliary data packet).

Reference is made again to FIG. 2. The receiver control circuit 30 comprises a receiver interface circuit 310 and a signal combination circuit 320. The receiver interface circuit 310 comprises a receiving circuit 312, a first data unpacking circuit 314 and a second data unpacking circuit 316. The receiving circuit 312 is configured to perform data communication with the transmitting circuit 226. The receiving circuit 312 has an encoding function, and is configured to encode and transmit the received first hybrid data packets MPa and the second hybrid data packets MPb to the first data unpacking circuit 314 and the second data unpacking circuit 316, respectively. The first data unpacking circuit 314 is configured to unpack the first hybrid data packets MPa, so as to regenerate the video signal VS at the receiver end and generate a first input signal INa comprising part of the information carried by the control signal CT. The second data unpacking circuit 316 is configured to unpack the second hybrid data packets MPb, so as to regenerate the audio signal AS and/or the auxiliary data signal AUX at the receiver end and generate a second input signal INb comprising another part of the information carried by the control signal CT. In addition, the receiving circuit 312 is further configured to restore the vertical synchronization signal Vsync, the horizontal synchronization signal Hsync, the data enable signal DEN and the pixel clock signal CLK at the receiver end by decoding, and configure to provide these signals to the display module 130.

Reference is made to FIG. 2, FIG. 3 and FIG. 4. The signal combination circuit 320 is configured to receive the first input signal INa and the second input signal INb respectively by a first input terminal and a second input terminal thereof. In the active video period AVP, the signal combination circuit 320 provides the first input signal INa to the display module 130 as the regenerated control signal CT. In specific, the receiver control circuit 30 generates the control signal CT according to information included in the first hybrid data packets MPa when the data enable signal DEN provides pulses. In the vertical back porch VBP and the vertical front porch VFP, the signal combination circuit 320 provides the second input signal INb to the display module 130 as the regenerated control signal CT.

FIG. 5 is a simplified functional block diagram of the signal distribution circuit 210 according to one embodiment of the present disclosure. The signal distribution circuit 210 comprises a demultiplexer 510 and a transmitter counting circuit 520. The demultiplexer 510 is configured to receive the control signal CT, and coupled to the first output terminal and the second output terminal of the signal distribution circuit 210. The transmitter counting circuit 520 is configured to receive the vertical synchronization signal Vsync, the horizontal synchronization signal Hsync, the data enable signal DEN, the pixel clock signal CLK or any combination thereof. For example, the transmitter counting circuit 520 may receive the vertical synchronization signal Vsync and the data enable signal DEN to determine that the transmitter control circuit 20 is operated in the vertical back porch VBP, the vertical front porch VFP or the active video period AVP. The transmitter counting circuit 520 is configured to control the demultiplexer 510 to distribute the control signal CT to one of the first output terminal and the second output terminal of the signal distribution circuit 210. That is, the transmitter counting circuit 520 controls the demultiplexer 510 to distribute the control signal CT to the first output terminal in the active video period AVP, and controls the demultiplexer 510 to distribute the control signal CT to the second output terminal in the vertical back porch VBP and the vertical front porch VFP.

FIG. 6 is a simplified functional block diagram of the signal combination circuit 320 according to one embodiment of the present disclosure. The signal combination circuit 320 comprises a multiplexer 610 and a receiver counting circuit 620. The multiplexer 610 is coupled to the first input terminal and the second input terminal of the signal combination circuit 320, and configured to receive the first input signal INa and the second input signal INb. The receiver counting circuit 620 is configured to receive one or more of the vertical synchronization signal Vsync, the horizontal synchronization signal Hsync, the data enable signal DEN and the pixel clock signal CLK. For example, the receiver counting circuit 620 may receive the vertical synchronization signal Vsync and the data enable signal DEN to determine that the receiver control circuit 30 is operated in the vertical back porch VBP, the vertical front porch VFP or the active video period AVP. The receiver counting circuit 620 is configured to control the multiplexer 610 to provide one of the first input signal INa and the second input signal INb to the display module 130 as the control signal CT. That is, the receiver counting circuit 620 controls the multiplexer 610 to select the first input signal INa as the control signal CT in the active video period AVP, and controls the multiplexer 610 to select the second input signal INb as the control signal CT in the vertical back porch VBP and the vertical front porch VFP.

Figure 7:
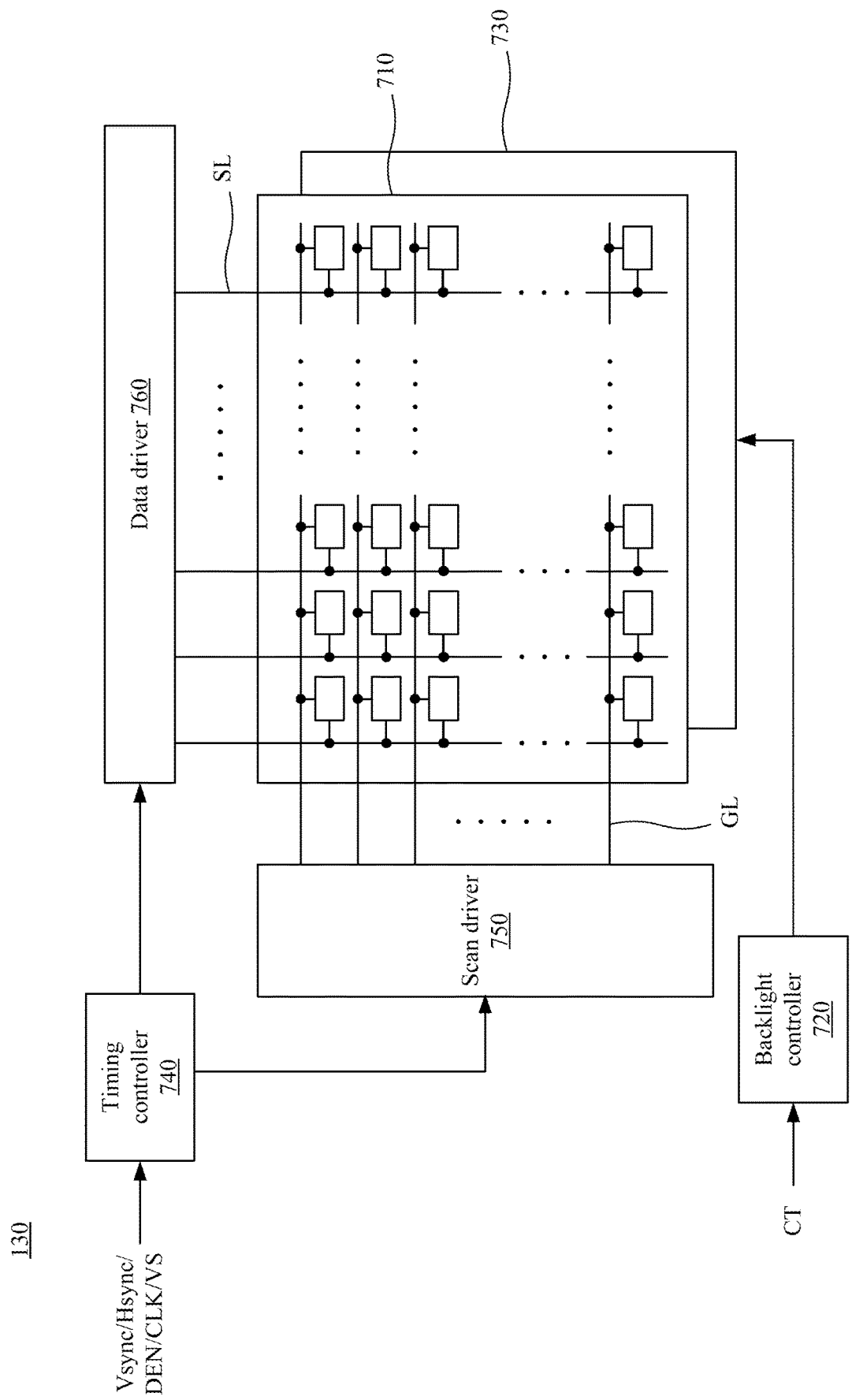
FIG. 7 is a simplified functional block diagram of the display module according to one embodiment of the present disclosure.

FIG. 7 is a simplified functional block diagram of the display module 130 according to one embodiment of the present disclosure. The display module 130 comprise a pixel array 710, a backlight controller 720, a backlight module 730, a timing controller 740, a scan driver 750, a data driver 760, a plurality of gate lines GL and a plurality of source lines SL. The backlight controller 720 is configured to receive the control signal CT, and configured to operate the backlight module 730 according to the control signal CT. The gate lines GL and the source lines SL are coupled to the scan driver 750 and the data driver 760, respectively, and pixels in the pixel array 710 are arranged correspondingly to the intersections of the gate lines GL and the source lines SL. The timing controller 740 is configured to receive the vertical synchronization signal Vsync, the horizontal synchronization signal Hsync, the data enable signal DEN, the pixel clock signal CLK and the video signal VS. The timing controller 740 is configured to generate a plurality of operation clocks according to the received signals, so as to drive the scan driver 750 and the data driver 760. The timing controller 740 is also configured to generate display data for the data driver 760 so as to determine grayscales of the pixels. Operations of the scan driver 750 and the data driver 760 are apparent to those of ordinary skill in the art, so the descriptions thereof are omitted.

In some embodiments, the display module 130 comprises a loudspeaker circuit (not shown). The loudspeaker circuit is configured to receive the audio signal AS and the auxiliary data signal AUX as shown in FIG. 2. The loudspeaker circuit may regenerate the audio clock, according to the auxiliary data signal AUX, to play audio information carried by the audio signal AS. In other embodiments that the display module 130 does not include the loudspeaker circuit, the display module 130 is free from receiving the audio signal AS and the auxiliary data signal AUX.

Reference is made to FIG. 3, FIG. 4 and FIG. 7. In some embodiments, the pixel array 710 of FIG. 7 has a resolution of M×N, that is, each gate line GL is coupled to M pixels and each source line SL is coupled to N pixels, in which M and N are positive integers. For convenience, the number of pixels coupled to the gate line GL is referred to as a horizontal resolution of the display module 130. In some embodiments, a width of a pulse of the data enable signal DEN corresponds to the horizontal resolution of the display module 130, that is, the width of the pulse of the data enable signal DEN is approximately equal to a width of M pulses of the pixel clock signal CLK.

In the embodiment of FIG. 3 and FIG. 4, the width of the pulse of the data enable signal DEN is greater than the horizontal resolution of the display module 130 of FIG. 7. The width of the pulse of the data enable signal DEN is approximately equal to a width of K pulses of the pixel clock signal CLK, in which K is a positive integer and greater than M. The user may define the value of K based on requirements to extend the time for transmitting row data by a predetermined time length PP as shown in FIG. 4, so as to increase the continuous bandwidth of the active video period AVP.

Accordingly, the multimedia signal transmission control system 120 can transmit various signals through the single transmission interface, which simplifies the types of connectors of the multimedia broadcasting system 100 and to reduce the number of transmission lines. Therefore, the multimedia broadcasting system 100 is conductive to realize a thinner and lighter design.

In addition, since the multimedia signal transmission control system 120 mixes the information of the control signal CT with information of other signals, the information of the control signal CT can be transmitted in the entire video frame. As a result, the multimedia signal transmission control system 120 can provide sufficient continuous bandwidth even though there is only one transmission interface for data communication.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled to a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A multimedia signal transmission control system, comprising:
   a transmitter control circuit, configured to pack, in an active video period of a video frame, a control signal and a video signal into a plurality of first hybrid data packets, and configured to pack, in a vertical front porch and a vertical back porch of the video frame, the control signal and an audio signal into a plurality of second hybrid data packets, wherein the active video period is between and adjacent to the vertical front porch and the vertical back porch; and
   a receiver control circuit, coupled to the transmitter control circuit, configured to receive the plurality of first hybrid data packets in the active video period, and configured to receive the plurality of second hybrid data packets in the vertical front porch and the vertical back porch, wherein the receiver control circuit is configured to unpack the plurality of first hybrid data packets and the plurality of second hybrid data packets to provide the control signal, the video signal and the audio signal to a display module,
   wherein the transmitter control circuit comprises:
      a signal distribution circuit, comprising a first output terminal and a second output terminal, configured to receive the control signal, wherein the signal distribution circuit distributes the control signal to the first output terminal to output the control signal by the first output terminal in the active video period, and distributes the control signal to the second output terminal to output the control signal by the second output terminal in the vertical front porch and the vertical back porch; and
      a transmitter interface circuit, coupled to the first output terminal, the second output terminal and the receiver control circuit, wherein the transmitter interface circuit is configured to generate the plurality of first hybrid data packets according to a signal received from the first output terminal and the video signal, and also configured to generate the plurality of second hybrid data packets according to a signal received from the second output terminal and the audio signal.

2. The multimedia signal transmission control system of claim 1, wherein the video signal is configured to specify grayscales of a plurality of pixels of the display module.

3. The multimedia signal transmission control system of claim 1, wherein the signal distribution circuit comprises:
   a demultiplexer, configured to receive the control signal, and coupled to the first output terminal and the second output terminal; and
   a transmitter counting circuit, configured to control, according to a vertical synchronization signal and a data enable signal, the demultiplexer to distribute the control signal to one of the first output terminal and the second output terminal, wherein an interval between two adjacent pulses of the vertical synchronization signal is a length of the video frame, and each pulse of the data enable signal is configured to control the display module to update a corresponding row of pixels of the display module.

4. The multimedia signal transmission control system of claim 1, wherein the transmitter control circuit is configured to provide a pixel clock signal to the display module through the receiver control circuit, and each pulse of the pixel clock signal is configured to control the display module to update a corresponding pixel of the display module,
   wherein the transmitter control circuit is configured to receive a data enable signal, when the data enable signal provides a pulse, the transmitter control circuit transmits the plurality of first hybrid data packets, and the pulse of the data enable signal is configured to control the display module to update a corresponding row of pixels of the display module,
   wherein a width of the pulse of the data enable signal corresponds to a width of K pulses of the pixel clock signal, K is a positive integer and greater than a horizontal resolution of a pixel array of the display module.

5. The multimedia signal transmission control system of claim 1, wherein the receiver control circuit comprises:
   a signal combination circuit, comprising a first input terminal and a second input terminal; and
   a receiver interface circuit, coupled to the transmitter control circuit, the first input terminal and the second input terminal, configured to unpack the plurality of first hybrid data packets and the plurality of second hybrid data packets to generate a first input signal and a second input signal, respectively, and configured to provide the first input signal and the second input signal to the first input terminal and the second input terminal, respectively,
   wherein the signal combination circuit provides the first input signal as the control signal to the display module in the active video period, and the signal combination circuit provides the second input signal as the control signal to the display module in the vertical front porch and the vertical back porch.

6. The multimedia signal transmission control system of claim 5, wherein the signal combination circuit comprises:
   a multiplexer, coupled to the first input terminal and the second input terminal, and configured to receive the first input signal and the second input signal; and
   a receiver counting circuit, configured to control, according to a vertical synchronization signal and a data enable signal, the multiplexer to provide one of the first input signal and the second input signal as the control signal to the display module, wherein an interval between two adjacent pulses of the vertical synchronization signal is a length of the video frame, and each pulse of the data enable signal is configured to control the display module to update a corresponding row of pixels of the display module.

7. A transmitter control circuit, applicable to a multimedia signal transmission control system, wherein the transmitter control circuit is configured to pack, in an active video period of a video frame, a control signal and a video signal into a plurality of first hybrid data packets, and configured to pack, in a vertical front porch and a vertical back porch of the video frame, the control signal and an audio signal into a plurality of second hybrid data packets, wherein the active video period is between and adjacent to the vertical front porch and the vertical back porch,
   wherein when the transmitter control circuit is coupled to a receiver control circuit, the receiver control circuit receives the plurality of first hybrid data packets in the active video period, and receives the plurality of second hybrid data packets in the vertical front porch and the vertical back porch, wherein the receiver control circuit unpacks the plurality of first hybrid data packets and the plurality of second hybrid data packets, so that the transmitter control circuit provides the control signal, the video signal and the audio signal to a display module through the receiver control circuit, wherein the transmitter control circuit comprises:
- a signal distribution circuit, comprising a first output terminal and a second output terminal, configured to receive the control signal, wherein the signal distribution circuit distributes the control signal to the first output terminal to output the control signal by the first output terminal in the active video period, and distributes the control signal to the second output terminal to output the control signal by the second output terminal in the vertical front porch and the vertical back porch; and
- a transmitter interface circuit, coupled to the first output terminal, the second output terminal and the receiver control circuit, wherein the transmitter interface circuit is configured to generate the plurality of first hybrid data packets according to a signal received from the first output terminal and the video signal, and also configured to generate the plurality of second hybrid data packets according to a signal received from the second output terminal and the audio signal.

8. The transmitter control circuit of claim 7, wherein the video signal is configured to specify grayscales of a plurality of pixels of the display module.

9. The transmitter control circuit of claim 7, wherein the signal distribution circuit comprises:
- a demultiplexer, configured to receive the control signal, and coupled to the first output terminal and the second output terminal; and
- a transmitter counting circuit, configured to control, according to a vertical synchronization signal and a data enable signal, the demultiplexer to distribute the control signal to one of the first output terminal and the second output terminal, wherein an interval between two adjacent pulses of the vertical synchronization signal is a length of the video frame, and each pulse of the data enable signal is configured to control the display module to update a corresponding row of pixels of the display module.

10. The transmitter control circuit of claim 7, wherein the transmitter control circuit is configured to provide a pixel clock signal to the display module through the receiver control circuit, and each pulse of the pixel clock signal is configured to control the display module to update a corresponding pixel of the display module, wherein the transmitter control circuit is configured to receive a data enable signal, when the data enable signal provides a pulse, the transmitter control circuit transmits the plurality of first hybrid data packets, and the pulse of the data enable signal is configured to control the display module to update a corresponding row of pixels of the display module, wherein a width of the pulse of the data enable signal corresponds to a width of K pulses of the pixel clock signal, K is a positive integer and greater than a horizontal resolution of a pixel array of the display module.

11. A receiver control circuit, suitable for a multimedia signal transmission control system, wherein the receiver control circuit is configured to be coupled to a transmitter control circuit, the transmitter control circuit is configured to pack, in an active video period of a video frame, a control signal and a video signal into a plurality of first hybrid data packets, and configured to pack, in a vertical front porch and a vertical back porch of the video frame, the control signal and an audio signal into a plurality of second hybrid data packets, wherein the active video period is between and adjacent to the vertical front porch and the vertical back porch, wherein the receiver control circuit is configured to receive the plurality of first hybrid data packets in the active video period, and configured to receive the plurality of second hybrid data packets in the vertical front porch and the vertical back porch, wherein the receiver control circuit is configured to unpack the plurality of first hybrid data packets and the plurality of second hybrid data packets to provide the control signal, the video signal and the audio signal to a display module, wherein the receiver control circuit comprises:
- a signal combination circuit, comprising a first input terminal and a second input terminal; and
- a receiver interface circuit, coupled to the transmitter control circuit, the first input terminal and the second input terminal, configured to unpack the plurality of first hybrid data packets and the plurality of second hybrid data packets to generate a first input signal and a second input signal, respectively, and configured to provide the first input signal and the second input signal to the first input terminal and the second input terminal, respectively, wherein the signal combination circuit provides the first input signal as the control signal to the display module in the active video period, and the signal combination circuit provides the second input signal as the control signal to the display module in the vertical front porch and the vertical back porch.

12. The receiver control circuit of claim 11, wherein the video signal is configured to specify grayscales of a plurality of pixels of the display module.

13. The receiver control circuit of claim 11, wherein the signal combination circuit comprises:
- a multiplexer, coupled to the first input terminal and the second input terminal, and configured to receive the first input signal and the second input signal; and
- a receiver counting circuit, configured to control, according to a vertical synchronization signal and a data enable signal, the multiplexer to provide one of the first input signal and the second input signal as the control signal to the display module, wherein an interval between two adjacent pulses of the vertical synchronization signal is a length of the video frame, and each pulse of the data enable signal is configured to control the display module to update a corresponding row of pixels of the display module.

14. The receiver control circuit of claim 11, wherein the receiver control circuit receives a pixel clock signal from the transmitter control circuit, and provides the pixel clock signal to the display module, wherein each pulse of the pixel clock signal is configured to control the display module to update a corresponding pixel of the display module, wherein the receiver control circuit is configured to receive a data enable signal, when the data enable signal provides a pulse, the receiver control circuit generates the control signal according to information in the plurality of first hybrid data packets, and each pulse of the data enable signal is configured to control the display module to update a corresponding row of pixels of the display module, wherein a width of the pulse of the data enable signal corresponds to a width of K pulses of the pixel clock signal, K is a positive integer and greater than a horizontal resolution of a pixel array of the display module.

* * * * *